United States Patent
Chernoff

(10) Patent No.: US 7,962,314 B2
(45) Date of Patent: Jun. 14, 2011

(54) MECHANISM FOR PROFILING PROGRAM SOFTWARE RUNNING ON A PROCESSOR

(75) Inventor: Anton Chernoff, Littleton, MA (US)

(73) Assignee: GLOBAL FOUNDRIES Inc., Grand Cayman (KY)

( * ) Notice: Subject to any disclaimer, the term of this patent is extended or adjusted under 35 U.S.C. 154(b) by 520 days.

(21) Appl. No.: 11/958,764

(22) Filed: Dec. 18, 2007

(65) Prior Publication Data

US 2009/0157359 A1 Jun. 18, 2009

(51) Int. Cl.
*G06F 11/30* (2006.01)
*G21C 17/00* (2006.01)

(52) U.S. Cl. ........ 702/186; 702/121; 702/122; 702/123; 717/130; 712/227; 712/229

(58) Field of Classification Search .......... 702/121–123, 702/186–189
See application file for complete search history.

(56) References Cited

U.S. PATENT DOCUMENTS

| | | | |
|---|---|---|---|
| 6,256,775 B1 | 7/2001 | Flynn | |
| 2005/0273310 A1 | 12/2005 | Newburn | |
| 2006/0143608 A1 | 6/2006 | Dostert | |
| 2006/0248283 A1 | 11/2006 | Galchev | |
| 2006/0294347 A1 | 12/2006 | Zou | |
| 2007/0079020 A1 | 4/2007 | Chinya | |
| 2007/0079294 A1* | 4/2007 | Knight et al. | 717/130 |

OTHER PUBLICATIONS

International Search Report in application No. PCT/US2008/013311 mailed Jun. 24, 2009.

* cited by examiner

*Primary Examiner* — Andrew Schechter
*Assistant Examiner* — Phuong Huynh
(74) *Attorney, Agent, or Firm* — Meyertons, Hood, Kivlin, Kowert & Goetzel, P.C.

(57) ABSTRACT

A processor having one or more processor cores includes execution logic that may execute instructions including one or more processes. Each process may include one or more execution threads. The processor also includes a profiling mechanism that includes monitor logic and a monitor process. The monitor logic may monitor the one or more processes and provide access to performance data associated with the one or more processes without interrupting a flow of control of the one or more processes being monitored. The monitor process may gather the performance data. In addition, the monitor process may include program instructions executable by the one more processor cores while operating in user mode.

14 Claims, 4 Drawing Sheets

FIG. 4

Profile Control Block 475

| 63 60 | 59 32 | 31 | 3 2 1 0 | |
|---|---|---|---|---|
| Rndom | Buffer Size | INT | Flags / DME BRE IRE EN | 0 |
| Buffer Base | | | | 8 |
| Buffer Tail Offset | | Buffer Head Offset | | 16 |
| Missed Samples | | | | 24 |
| 63 52 / NDBB Reserved | 44 40 39 32 / OTH RAD RNBMC CLF | Min Latency | 31 26 25 / Threshold | 32 |
| 63 58 57 / Resvd | Event Counter 0 | Event ID 0 / 31 26 25 | Event Interval 0 | 40 |
| 63 58 57 / Resvd | Event Counter 1 | Event ID 1 | Event Interval 1 | 48 |
| . . . | | 31 26 25 | | |
| 63 58 57 / Resvd | Event Counter N | Event ID N | Event Interval N | m |

MECHANISM FOR PROFILING PROGRAM SOFTWARE RUNNING ON A PROCESSOR

BACKGROUND OF THE INVENTION

1. Field of the Invention

This invention relates to microprocessors and, more particularly, mechanisms for the monitoring of microprocessor processes and process performance data gathering during program execution.

2. Description of the Related Art

For many years, software engineers and processor architects have recognized a need for the ability to measure the behavior of software during execution. A number of profiling mechanisms exist that are capable of measuring behaviors such as, for example, the frequency and duration of function calls. A profiler or program analysis tool may monitor a given process and provide an output stream of events, or a summary of the historical events.

There are a variety of ways to profile running software. For example, one way is to instrument the actual code that will run. Instrumenting typically refers to the insertion of monitor code into the program to be monitored. The instrumented code may output analysis data. Other types of profiling include event based profiling and statistical profiling. Some event based profilers use profiling modules that trap events such as calls, for example. Statistical profiling uses sampling by interrupting the operating system at predetermined intervals that may be based on time or on the number of times an event has occurred.

These types of conventional profilers do provide results. However, they tend to perturb the process that is being monitored by adding too much additional state to the CPU and the running process, and interrupting the process flow too frequently.

SUMMARY

Various embodiments of a mechanism for profiling software running on a processor are disclosed. In one embodiment, a processor having one or more processor cores includes execution logic that may execute instructions including one or more processes. Each process may include one or more execution threads. The processor also includes a profiling mechanism that includes monitor logic and a monitor process. The monitor logic may monitor the one or more processes and provide access to performance data associated with the one or more processes without interrupting a flow of control of the one or more processes being monitored. The monitor process may gather the performance data.

In one specific implementation, the monitor process comprises program instructions executable by the one more processor cores while operating in user mode.

BRIEF DESCRIPTION OF THE DRAWINGS

FIG. 4 is a diagram illustrating one embodiment of an exemplary profiling control block.

Figure 1:
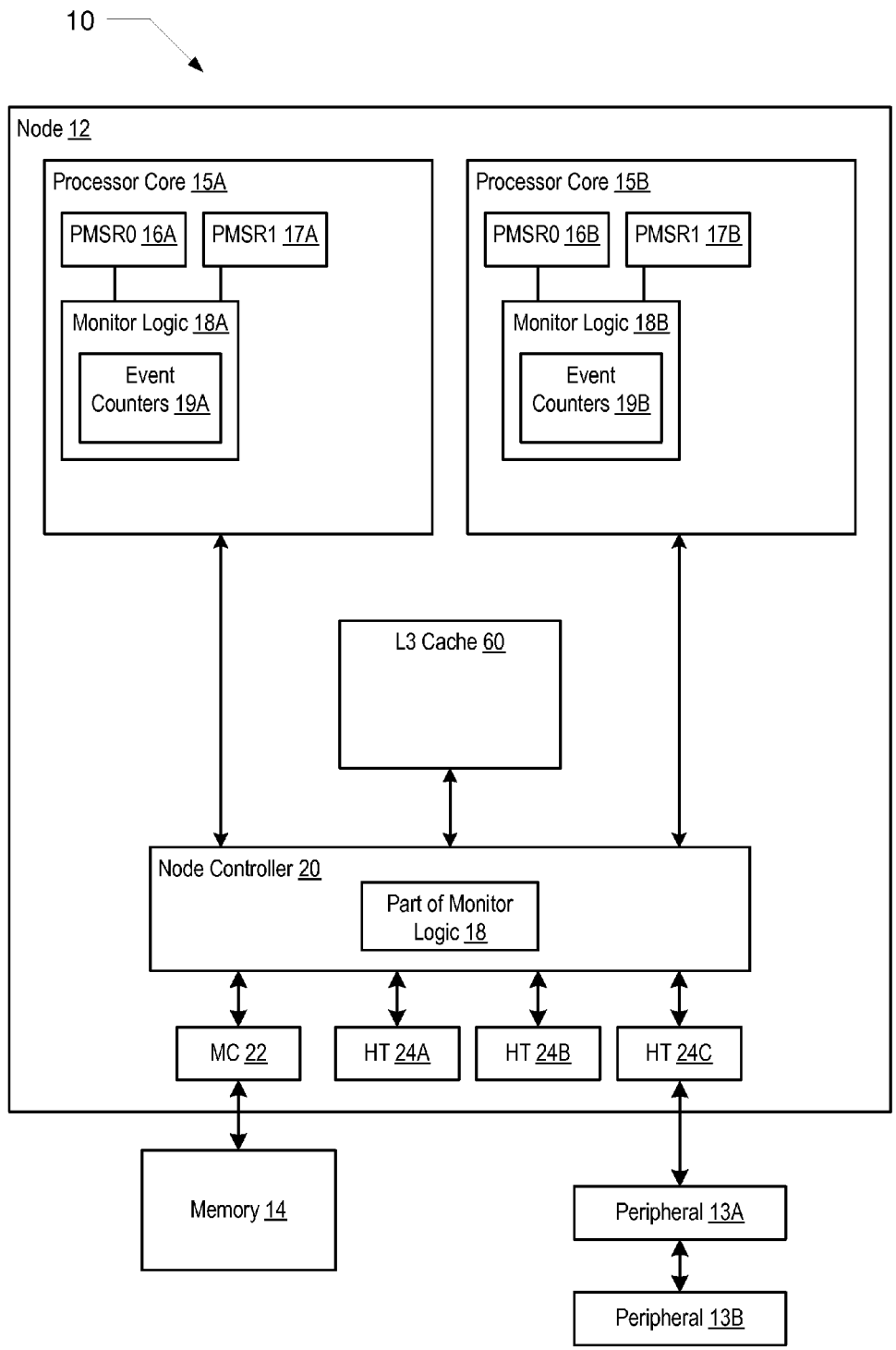
FIG. 1 is a block diagram of one embodiment of a computer system including a multi-core processing node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a computer system 10 is shown. In the illustrated embodiment, the computer system 10 includes a processing node 12 coupled to memory 14 and to peripheral devices 13A-13B. The node 12 includes processor cores 15A-15B coupled to a node controller 20 which is further coupled to a memory controller 22, a plurality of HyperTransport™ (HT) interface circuits 24A-24C, and a shared level three (L3) cache memory 60. The HT circuit 24C is coupled to the peripheral device 16A, which is coupled to the peripheral device 16B in a daisy-chain configuration (using HT interfaces, in this embodiment). The remaining HT circuits 24A-B may be connected to other similar processing nodes (not shown) via other HT interfaces (not shown). The memory controller 22 is coupled to the memory 14. In one embodiment, node 12 may be a single integrated circuit chip comprising the circuitry shown therein in FIG. 1. That is, node 12 may be a chip multiprocessor (CMP). Any level of integration or discrete components may be used. It is noted that processing node 12 may include various other circuits that have been omitted for simplicity. It is noted that reference designators that include a number and a letter (e.g., processor core 15A) may be referred to by the number only where appropriate.

Generally, the processor cores 15A-15B may use the interface(s) to the node controller 20 to communicate with one another and with other components of the computer system 10 (e.g. peripheral devices 13A-13B, other processor cores (not shown), the memory controller 22, etc.). The interface may be designed in any desired fashion. Cache coherent communication may be defined for the interface, in some embodiments. In one embodiment, communication on the interfaces between the node controller 20 and the processor cores 15A-15B may be in the form of packets similar to those used on the HT interfaces. In other embodiments, any desired communication may be used (e.g. transactions on a bus interface, packets of a different form, etc.). In other embodiments, the processor cores 15A-15B may share an interface to the node controller 20 (e.g. a shared bus interface). Generally, the communications from the processor cores 15A-15B may include requests such as read operations (to read a memory location or a register external to the processor core) and write operations (to write a memory location or external register), responses to probes (for cache coherent embodiments), interrupt acknowledgements, and system management messages, etc.

As described above, the memory 14 may include any suitable memory devices. For example, the memory 14 may comprise one or more random access memories (RAM) in the dynamic RAM (DRAM) family such as RAMBUS DRAMs (RDRAMs), synchronous DRAMs (SDRAMs), double data rate (DDR) SDRAM. Alternatively, memory 14 may be implemented using static RAM, etc. Memory 14 may sometimes be referred to as a computer readable storage medium in which program data and instructions may be stored and retrieved for execution. The memory controller 22 may comprise control circuitry for interfacing to the memories 14. Additionally, the memory controller 22 may include request queues for queuing memory requests, etc.

The HT circuits 24A-24C may comprise a variety of buffers and control circuitry for receiving packets from an HT link and for transmitting packets upon an HT link. The HT interface comprises unidirectional links for transmitting packets. Each HT circuit 24A-24C may be coupled to two such links (one for transmitting and one for receiving). A given HT interface may be operated in a cache coherent fashion (e.g. between processing nodes) or in a non-coherent fashion (e.g. to/from peripheral devices 16A-16B). In the illustrated embodiment, the HT circuits 24A-24B are not in use, and the HT circuit 24C is coupled via non-coherent links to the peripheral devices 16A-16B.

It is noted that, while the present embodiment uses the HT interface for communication between nodes and between a node and peripheral devices, other embodiments may use any desired interface or interfaces for either communication. For example, other packet based interfaces may be used, bus interfaces may be used, various standard peripheral interfaces may be used (e.g., peripheral component interconnect (PCI), PCI express, etc.), etc.

The peripheral devices 13A-13B may be any type of peripheral devices. For example, the peripheral devices 13A-13B may include devices for communicating with another computer system to which the devices may be coupled (e.g. network interface cards, circuitry similar to a network interface card that is integrated onto a main circuit board of a computer system, or modems). In addition, the peripheral devices 13A-13B may include video accelerators, audio cards, drive controllers, SCSI (Small Computer Systems Interface) adapters and telephony cards, sound cards, and a variety of data acquisition cards such as GPIB or field bus interface cards. Further, the peripheral devices 13A-13B may include non-volatile storage such as hard disks, floppy disk drives, flash drives, optical storage media, and the like. It is noted that the term "peripheral device" is also intended to encompass input/output (I/O) devices.

Generally, a processor core 15A-15B may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15B may implement the x86 architecture. As such, the processor cores may be operated in one or more modes or protection levels, which are typically referred to as CPU protection levels (CPLs) or protection rings. In the x86 architecture, there are four levels, designated CPL0 through CPL3, although only two are commonly used. One of the commonly used levels is CPL0, which is typically referred to as kernel mode and is the most privileged level. The other commonly used level is CPL3, which is typically referred to as user mode and is the least privileged level.

The processor cores 15A-15B may comprise any desired configurations, including superpipelined, superscalar, or combinations thereof. Other configurations may include scalar, pipelined, non-pipelined, etc. Various embodiments may employ out of order speculative execution or in order execution. The processor cores may include microcoding for one or more instructions or other functions, in combination with any of the above constructions. Various embodiments may implement a variety of other design features such as caches, translation lookaside buffers (TLBs), missed address buffers (MAB), model specific registers (MSRs), control registers (CRs), as well as other system level control hardware. Accordingly, in the illustrated embodiment, processor core 15A includes profiling hardware that includes PMSR0 and PMSR1 designated 16A and 17A, respectively, and monitor logic 18A, which includes event counters 19A. It is noted that in other embodiments, other numbers of profiling hardware elements such as model specific registers, for example, may be used. It is also noted that event counters 19A is shown as a single block. However, in various implementations, processor 15A may include a number of event counter units that may be placed in proximity to the events that are being counted. For example, if a particular event counter unit is counting instructions retired, the counter unit may be physically located near logic that maintains that information such as reorder buffer logic (not shown). As shown, processor core 15B includes similar features.

In various embodiments, node controller 20 may include a variety of interconnection circuits (not shown) for interconnecting processor cores 15A and 15B to each other, to other nodes, and to memory. Node controller 20 may also include functionality for selecting and controlling various node properties such as the maximum and minimum operating frequencies for the node, and the maximum and minimum power supply voltages for the node, for example. The node controller 20 may generally be configured to route communications between the processor cores 15A-15B, the memory controller 22, and the HT circuits 24A-24C dependent upon the communication type, the address in the communication, etc. In one embodiment, the node controller 20 may include a system request queue (SRQ) (not shown) into which received communications are written by the node controller 20. The node controller 20 may schedule communications from the SRQ for routing to the destination or destinations among the processor cores 15A-15B, the HT circuits 24A-24C, and the memory controller 22. In addition, in the illustrated embodiment, node controller 20 includes additional monitor logic that is part of the profiling hardware and is thus designated monitor logic 18, which may be configured to control among other things, the routing of monitor samples to memory 14 and to peripheral devices 13 during process profiling operations.

As will be described in greater detail below, processor core 15A and 15B may each be configured to concurrently execute one or more threads or processes. In addition, processor 15A and 15B may each include hardware and software functionality (i.e., the profiling mechanism) that enables process profiling. For example, processor 15A may be configured to execute a monitor process in either user mode (CPL3) or kernel mode (CPL0) that may gather performance data associated with user mode processes running on processor core 15A or processor core 15B without interrupting the control flow of the processes being monitored. As such, the processor core hardware such as the PMSR0 and PMSR1, monitor logic 18A, monitor logic 18B and monitor logic 18 may facilitate such gathering of performance data.

It is also noted that, while the computer system 10 illustrated in FIG. 1 includes one processing node 12, other embodiments may implement any number of processing nodes. Similarly, a processing node such as node 12 may include any number of processor cores, in various embodiments. Various embodiments of the computer system 10 may also include different numbers of HT interfaces per node 12, and differing numbers of peripheral devices 13 coupled to the node, etc.

Figure 2:
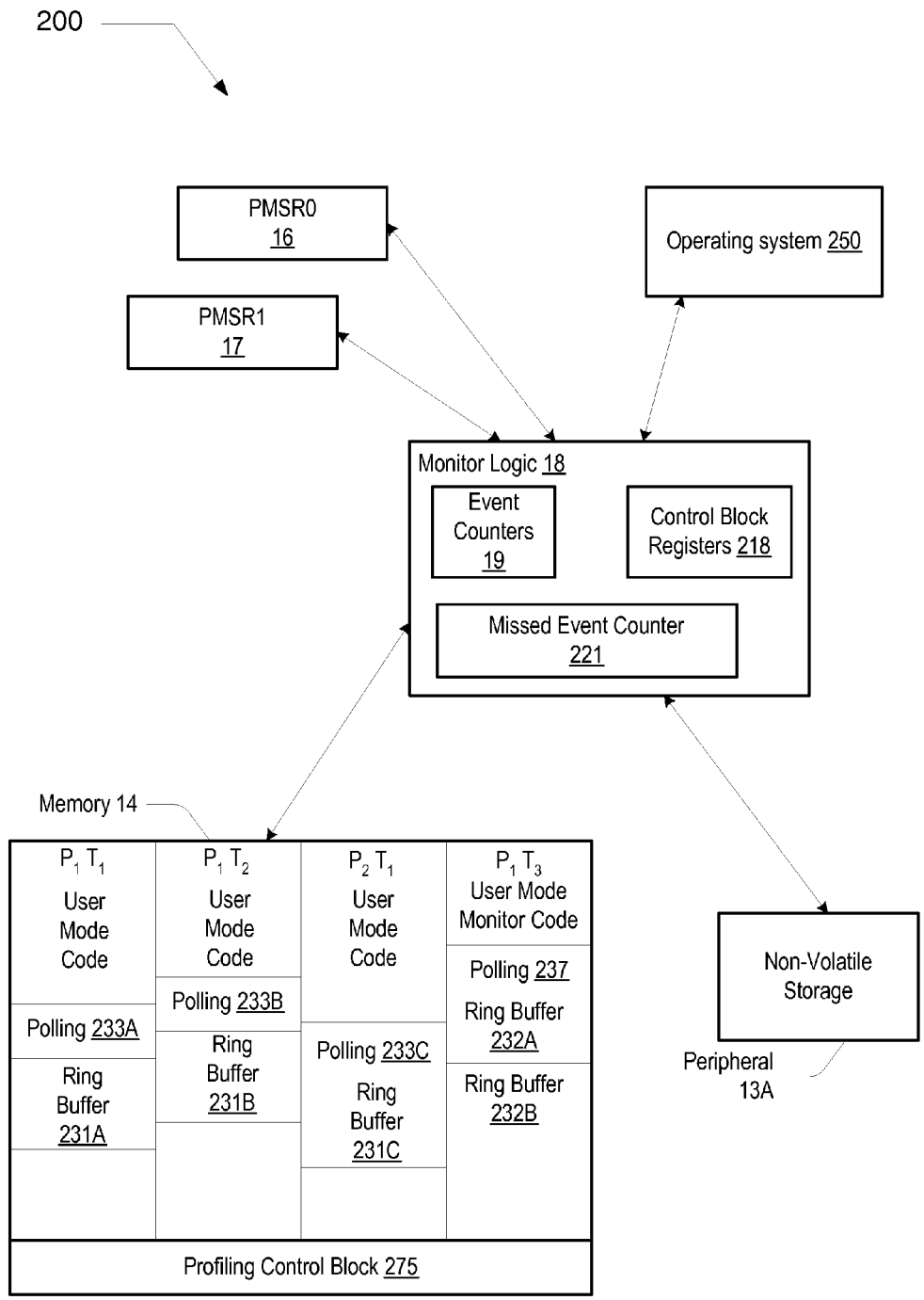
FIG. 2 is a block diagram illustrating more detailed aspects of an embodiment of the profiling mechanism of FIG. 1.

Turning to FIG. 2, an architectural diagram illustrating more detailed aspects of one particular embodiment of the profiling mechanism of FIG. 1 is shown. More particularly, monitor logic 18 includes event counters 19, a missed event counter 221 and in some implementations, control block registers 218. As shown, monitor logic 18 communicates with peripheral device 13A, which in the illustrated embodiment is depicted as a non-volatile storage such as a hard disk drive or flash drive, for example. Monitor logic 18 also communicates with memory 14, and operating system 250, which may represent an operating system (OS) instance executing on either or both processor cores 15A and 15B, respectively. As such in one embodiment, the profiling mechanism 200 may collectively include at least portions of the OS, monitor logic 18, PMSR0, and PMSR1, memory 14 and peripheral device 13A, for example.

The profiling mechanism 200 extends the processor architecture to allow user mode (CPL3) processes to gather performance data about themselves with very low overhead. For example, modules such as dynamic optimizers and managed runtime environments may be enabled to monitor the currently running program with high accuracy and resolution, thereby allowing them to report on performance problems and opportunities and fix them immediately. The architecture extensions may allow a program to gather performance data and examine it either by polling or by taking an occasional interrupt. It introduces minimal additional state to the CPU and to the process. It differs from conventional performance counters in that large quantities of data may be collected with no interrupts, considerably reducing the overhead of using performance feedback. More particularly, in one embodiment the profiling mechanism 200 described herein may be used with a polling scheme that requires no data collection interrupts at all. The profiling mechanism 200 may also allow a user mode program to control its data collection without calling a driver, which may be a software routine that interacts with data collection hardware or software. Finally, the profiling mechanism 200 may run within the context of a thread, so it may be used by multiple processes within a system at the same time.

In various embodiments, when enabled, the monitor logic 18 may be configured to monitor and count one or more events during the execution of user mode code and at predetermined intervals, to insert event records into a ring buffer (e.g., ring buffer 231A) in the address space of the running process within memory 14. Once a ring buffer is filled to a user-specified threshold, the monitor logic 18 may cause an interrupt to the OS, which the OS may use to signal a process to empty the buffer by moving the buffer contents to non-volatile storage (e.g., peripheral device 13A) or by using the buffer contents in some other way. With proper OS support, the interrupt may even be delivered to a separate process or thread. In some embodiments, the profiling mechanism 200 may allow the user program to manually insert information into an event record in the ring buffer, allowing the program to record software events that may affect the interpretation of the other data in the buffer.

Figure 3A:
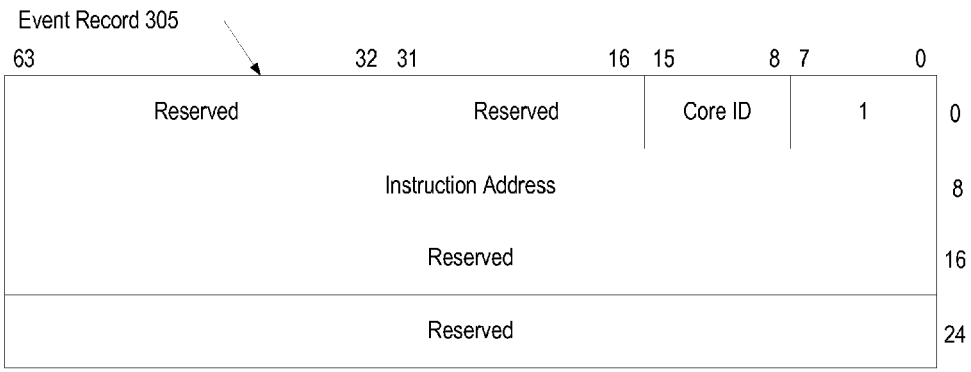
FIG. 3A is a diagram illustrating an exemplary instructions retired event record.
Figure 3B:
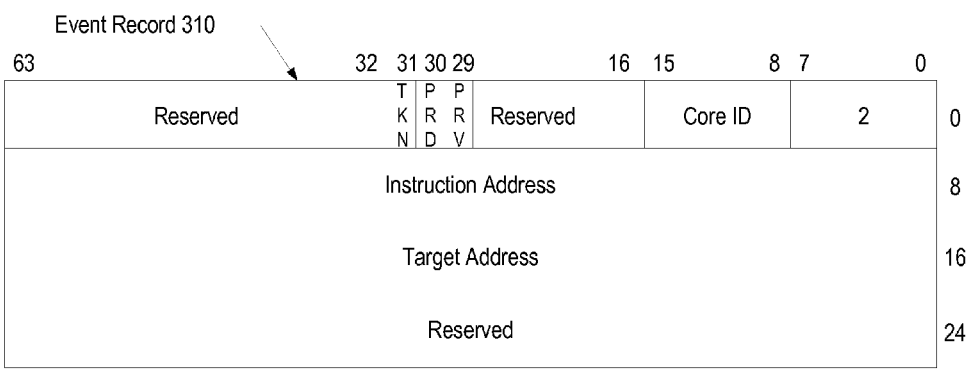
FIG. 3B is a diagram illustrating an exemplary branches retired event record.
Figure 3C:
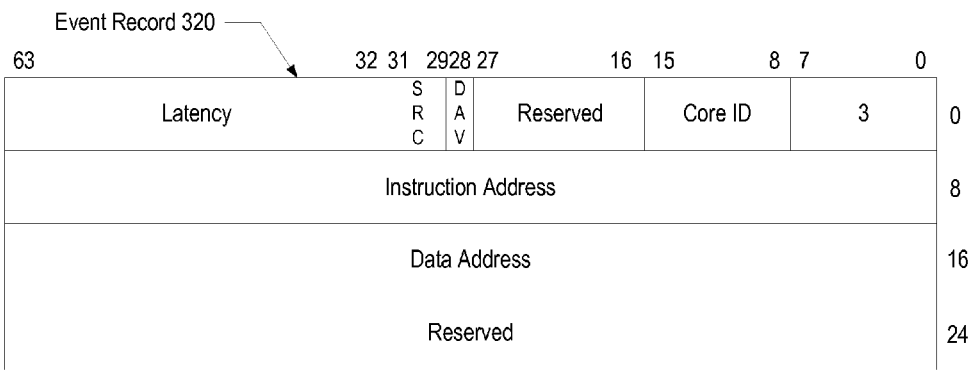
FIG. 3C is a diagram illustrating an exemplary DCache misses event record.

In one embodiment, the profiling mechanism 200 may gather information associated with events such as instructions retired, branches (i.e., transfer of control) retired, and certain data cache misses. However, it is contemplated that in other embodiments other events such as CPU cycles, data TLB misses, instruction TLB misses, floating point operations, instruction cache (ICache) misses, and memory lock contention, for example, may also me monitored. The event information may be recorded in event records, examples of which are illustrated in FIG. 3A through FIG. 3C.

To interoperate and cooperate with the OS, in various embodiments, the OS is configured to detect whether the profiling mechanism 200 is available and, if so, which profiling features are present. The OS must enable the profiling mechanism 200 if the OS will allow programs to interact with it. By enabling the profiling mechanism 200, the OS commits to context switching the profiling state. By enabling profiling interrupts, the OS commits to handling them. In addition, no data on the operation of the OS may "leak" to any user process, and no data on the operation of one user process may leak to any other process.

In the illustrated embodiment, memory 14 includes storage for a number of processes and threads, and for profiling control block information 275. More particularly, memory 14 is shown with four exemplary address spaces allocated for the processes and threads. Beginning on the left, process and thread (P1T1) includes user mode code that may include some application code and monitor code. In addition, the address space also includes a ring buffer 231A for storing event records. The monitor code may also include polling code that monitors the ring buffer 231A and as mentioned above, may be notified by monitor logic 18 when the ring buffer 231A fills to a predetermined threshold. The next address space is designated as P1T2, and is similar to P1T1 in that it also includes user mode code that includes monitor code and a ring buffer 231B. Similarly for the next address space designated P2T1, which refers to a second process and thread.

The fourth address space within memory 14 illustrates an embodiment of a monitor thread designated P1T3. The address space for the monitor thread includes space for a number of ring buffers (e.g., 232A and 232B). As shown, the monitor code is user mode code. The monitor thread P1T3 may be used to monitor a number of processes that may be executing on any processor core. In the illustrated embodiment, there are two ring buffers and thus two processes are being monitored. However, any number of threads or processes may be monitored in other embodiments. For example, if the monitor thread P1T3 is monitoring threads in other processes, the ring buffers 232A and 232B may be in memory that is shared with the processes being monitored and the buffers may be read and written by both the monitor thread P1T3 and by the threads being monitored.

During the monitoring of events, in one embodiment, instructions may be counted if they execute in user mode (e.g., CPL3) and contribute to the instruction count in that mode according to instruction counting standards such as the Advanced Micro Devices standard for counting instructions, for example. However, other embodiments may count instructions in other ways. Furthermore, profiling may be inactive while in (or entering or leaving) the System Management Mode (SMM).

Once profiling is enabled (described further below), the user thread may have complete control over its operations via new instructions. In one embodiment the new instructions may be called LLWPCB, SLWPCB, and LWPINS. These instructions may specify a pointer to the profiling control block 275 (shown in more detail FIG. 4), initialize internal profiling state, begin (or end) profiling operations, and insert event records into ring buffers. Each thread in a multi-threaded process may configure profiling operation separately. A thread has its own ring buffer and event counters which may be context switched with the rest of the thread state. However, ring buffers may be shared so that a single monitor thread such as thread P₁T₃ of FIG. 2 may process the data from multiple other threads in a given process.

During profiling operation, the monitor logic 18 may be configured to monitor and report on one or more types of events. In one embodiment, the monitor logic 18 may include functionality configured to count events, gather event records, store event records to buffers in memory (e.g., ring buffers 231, 232), report buffer fills, and reset a particular event counter when an event record is stored, and control the transfer of information in the ring buffers to non-volatile storage. These functions are described in greater detail below.

In one embodiment, each time an instruction is retired, monitor logic 18 decrements its internal event counters 19 for all of the events associated with the instruction. An instruction may cause zero, one, or multiple events. For example, an indirect jump through a pointer in memory counts as an instruction retired, a branch retired, and may also cause up to two data cache (DCache) misses (or more, if there is a TLB miss) and up to two instruction cache (ICache) misses. In addition, some events may have filters or conditions on them that may regulate counting. For example, a cache miss event might specify that only events with latency greater than a specified minimum are eligible to be counted.

In addition, when an event counter reaches zero, the event should be reported. Accordingly, the monitor logic 18 gathers an event record (shown in FIG. 3A). More particularly, in one implementation, in an internal copy of an event record may be written. For most events, such as instructions retired, the monitor logic 18 may be configured to gather an event record describing the instruction that caused the counter to reach zero. However, as will be described in greater detail below, the monitor logic 18 may be configured to gather event record data for the next instruction that causes the event, or to take other alternatives to capture the record.

The monitor logic 18 may gather event information on one or many events at any one time (i.e., concurrently), dependent on the specific implementation. In one implementation, the monitor logic 18 may select one of the eligible events while other expired events wait until the selected event record is written to memory 14, and monitor logic 18 may then pick the next eligible instruction for the waiting event. In another implementation, if multiple event counters reach zero, the monitor logic 18 may gather one event record per event and write them sequentially to memory 14.

Monitor logic 18 may be configured to discard an event occurrence in certain instances. For example, if a given ring buffer needs to be paged in from disk, there may be no way to preserve the pending event record data. If an event is discarded, the monitor logic 18 may gather an event record for the next instruction to cause the event. Similarly, if the monitor logic 18 needs to replay an instruction to gather a complete event record, the replay may for some reason abort instead of retiring. In this case, the event counter 19 remains at zero and the monitor logic 18 gathers an event record for the next instruction to cause the event.

When a complete event record has been gathered, such as when the event counter reaches zero, the monitor logic 18 may be configured to store the event into a ring buffer (e.g., 231) in the process' address space and to advance a ring buffer pointer. If the ring buffer is full at this time, the monitor logic 18 may increment the missed event counter of missed events and may not advance the ring buffer pointer.

If more than one event record is ready to be stored simultaneously, in one implementation, only one event need be stored. The monitor logic 18 may delay storing other event records or it may discard the information and return to select the next eligible instruction for the discarded event type(s), as desired. It is noted that the store need not complete synchronously with the instruction retiring. In other words, if the profiling mechanism 200 buffers the event record contents, the store stage (and subsequent stages) may complete some number of cycles after the instruction which caused the event retires. The data associated with the event and the instruction is precise, but the rest of the profiling process may complete later.

If profiling threshold interrupts are enabled and the space used in the ring buffer exceeds a user-defined predetermined threshold, the monitor logic 18 may be configured to initiate an interrupt, so the OS can signal some process to empty the buffer. This interrupt may be directed to the process being monitored or to a separate process or thread, such as P1T3 as described in the above example. It is noted that the interrupt may occur significantly later than the event that caused the threshold to be met.

In response to an event record being stored, the counter for the event that was stored is reset to its programmed interval (with any randomization applied), and counting for that event may start again. Reset happens if the event record is stored or if the missed event counter was incremented.

In one embodiment, the user process can wait until an interrupt occurs to process the events in the ring buffer. However, this may require some kernel or driver support. As such, interrupts may only be enabled if a kernel mode routine allows it. For example, the user program may call a driver to associate the profiling mechanism interrupt with a semaphore or mutex. When the interrupt occurs, the driver signals the associated object. Any thread waiting on the object may wake up and may process the buffer. However, it is contemplated that other driver models are possible.

In another embodiment, the user process may have a thread that periodically polls (e.g., 233) the ring buffer (e.g., 231) and removes event records from it, advancing the tail pointer so that the profiling mechanism 200 hardware can continue storing records.

As described above, when a monitored event overflows its event counter, the monitor logic 18 writes an event record into the appropriate event ring buffer. In various embodiments, and as shown in FIG. 3A through FIG. 3C, each event record in the ring buffer is 32 bytes long. However, it is contemplated that in other embodiments any number of bytes may be used as desired. The actual record size may be determined by using a CPUID command to characterize the profiling mechanism 200. It is noted that Reserved fields in event records may be set to zero when the profiling mechanism 200 writes an event record. However, other embodiments may provide other ways of characterizing the profiling mechanism. It is noted that the event records shown in FIG. 3A through FIG. 3C are exemplary records. In other embodiments, event records may include other fields, the fields may be arranged differently in the record, or the fields may have different sizes than the event records shown in FIG. 3A through FIG. 3C.

Referring to FIG. 3A, an exemplary event record 305 for instructions retired is shown. In the first row, beginning from the right, byte 0 is the event ID field, which specifies the event record type. The event ID of one (1) represents the instructions retired event record. In one embodiment, valid identifiers are 1 to 255, and zero is an invalid event identifier. The next byte is the core identifier field. For multicore systems, this field identifies the core on which the profiling mechanism 200 is running. This field allows software to aggregate event records from multiple threads into a single buffer without losing CPU information. In one embodiment, for single core systems an ID of zero may be used. In some embodiments, the core identifier may be supplied from a machine specific register (MSR) or other value that is initialized by the operating system or other code. The next two bytes is an event-specific flags field and may include any number of flags dependent on the type of event record. In the present exemplary event record, the entire field is reserved. The next four bytes represent an event-specific data field. In the present exemplary event record, these bytes are reserved. The next row includes bytes 8:15, and represents the instruction address.

In one embodiment, an event counter is decremented each time an instruction retires. When the counter reaches zero, monitor logic 18 within the profiling mechanism 200 may be configured to store an event record with an event identifier of (1). Bytes 8:15 of the event record contain the linear instruction pointer address of the instruction whose execution caused the event.

Referring to FIG. 3B, an exemplary event record 310 for branches retired is shown. The structure of the event record 310 is similar to the event record 305 shown in FIG. 3A. However as shown in FIG. 3B, the event ID is two (2), designating this event record as a branches retired event record. The event specific flags field includes three flags at bit locations 31:29. Those flags are TKN, PRD, and PRV, respectively. In one embodiment, the TKN bit will indicate a logic one (1) if branch was taken, and a logic zero (0) if not taken. The PRD bit will indicate a logic one (1) if branch was predicted correctly, and a logic zero (0) if not mispredicted. The PRV bit will indicate a logic one (1) if the PRD bit is valid, and a logic zero (0) if prediction information not available. Similar to FIG. 3A, bytes 8:15 of FIG. 3B also include an instruction address. In addition, bytes 16:23 represent the address of the instruction after the branch. This is the target if the branch was taken and the fall-through address if the branch is not taken.

In various embodiments, an event counter is decremented each time a transfer of control retires, regardless of whether or not it is taken. The transfer of control includes short and long jumps (including JCXZ and its variants), LOOPx, CALL, and RET instructions. However, it may not include traps or interrupts, whether synchronous or asynchronous, nor does it include operations that switch to or from CPL3 or SMM or SVM, such as SYSCALL, SYSENTER or INT 3.

When the counter reaches zero, monitor logic 18 within the profiling mechanism 200 may be configured to store an event record with an event identifier of 2. The flags indicate whether the branch was taken (always true for unconditional transfers) and whether it was correctly predicted (always true for direct branches). The record also includes the addresses of the branch instruction and the branch target. For not-taken conditional branches, the target is the fall-through address. Some implementations of the profiling mechanism 200 may not capture branch prediction information on some or all branches. A bit in the event record may indicate whether prediction information is valid.

Referring to FIG. 3C, an exemplary event record 320 for DCache misses is shown. The structure of the event record 320 is similar to the event record 305 and 310 shown in FIG. 3A and 3B, respectively. However as shown in FIG. 3C, the event ID is three (3), designating this event record as a DCache misses event record. The event specific flags field includes two flags at bit locations 31:28. Those flags are SRC, which includes bit locations 31:28, and DAV, respectively. In one embodiment, the SRC bits represent a 3-bit encoding of the source for the requested data. An exemplary set of SRC encodings is shown in Table 1, although other encodings are possible and contemplated. The DAV bit will indicate a logic one (1) if the data address is valid, and a logic zero (0) if the data address is not available. Similar to FIG. 3A, bytes 8:15 of FIG. 3C also include an instruction address. In addition, bytes 16:23 represent the address of the memory reference (if the DAV bit=1). The event specific data bytes are designated "Latency" and indicate the total latency of cache miss (in cycles), as described further below.

TABLE 1

| Source bits encodings | |
|---|---|
| 0 | No valid status |
| 1 | Local L3 cache |
| 2 | Remote CPU or L3 cache |
| 3 | DRAM |
| 4 | Reserved (for Remote cache) |
| 5 | Reserved |
| 6 | Reserved |
| 7 | Other (MMIO/Config/PCI/APIC) |

In various embodiments, the event counter is decremented each time a load from memory causes a DCache miss whose latency exceeds the a predetermined Latency threshold and/or whose data comes from a level of the cache or memory hierarchy that is selected for counting. In one embodiment, a misaligned access that causes two misses on a single load only decrements the event counter by 1 and, if it reports an event, the data is for the lowest address that missed. The profiling mechanism 200 may not count cache misses that are indirectly due to TLB walks, local or global descriptor table (LDT, GDT) references, TLB misses, etc. Accordingly, in one embodiment, the profiling mechanism 200 may be configured to only counts loads directly caused by the instruction.

When the counter reaches zero, monitor logic 18 may be configured to store an event record with an event identifier of 3. The flags optionally indicate the source of the data, if available. The event record includes the total latency, the address of the load instruction, and the address of the referenced data. However, cache misses caused by the profiling hardware itself are not subject to counting.

It is noted that the x86 architecture allows multiple loads to be outstanding simultaneously. However, in some cases it may be impractical to have a full latency counter for every load that is waiting for a cache miss to be resolved. In such cases it is contemplated that a variety of simplifications may be used.

For example, in one implementation, the latency may be rounded to a multiple of $2^j$, where j is in the range from 1 to 4 inclusive. For example, in the rest of this section, assume that j=4, so $2^j=16$. The low 4 bits of latency reported in the event record will be 0. The actual latency counter may be incremented by 16, every 16 cycles of waiting. The value of j is returned as "PLatencyRnd" or some similar name by the CPUID instruction when querying for profiling mechanism features. However, other mechanisms may be used to return the value of j.

In another implementation, an approximation may be performed when starting to count latency. If counting in increments of 16, the 16 cycles need not start when the load begins to wait. Instead, the latency value may be bumped from 0 to 16 any time during the first 16 cycles of waiting.

In another implementation, the total latency may be capped to $2^n$-16 (where n>/=10). Thus, the latency counter implements a saturating counter that stops counting when it reaches its maximum value. For example, if n=10, the latency value will range from 0 to 1008 in steps of 16, and then stop at 1008. In addition, if n=10, each counter may be implemented using a mere 6 bits. The value of n is returned as PLatencyMax by the CPUID instruction (or another mechanism) when querying for profiling mechanism features.

It is noted that in the above example the latency threshold used to filter events is a multiple of 16 when performing the comparison that decides whether a cache miss event is eligible to be counted. It is also noted that when determining whether to use the above simplifications, whatever is practical in terms of area and power should be chosen.

As described above, the event record for a DCache miss reports the linear address of the data. The way the linear address is recorded affects the exact event that is reported and the amount of time it takes to report a cache miss event. Accordingly, monitor logic 18 may capture data for either the event that caused the counter to reach zero, or for the next eligible event.

Profiling Setup

During operation, in one embodiment, to identify whether the profiling mechanism 200 is present, the CPUID instruction may be used. More particularly, in response to executing Call: CPUID<=EAX: 8000_0001, the processor EDX bit 0 may be returned. If bit 0 is asserted to logic value of one (1), the profiling mechanism 200 is present, and if bit 0 is asserted to logic value of zero (0), the profiling mechanism 200 is not present. However, it is contemplated that in other embodiments, the logic values and their corresponding functions may be reversed.

In addition, to identify the supported profiling mechanism capabilities, the CPUID instruction may be used with a new leaf request code. For example, executing Call: CPUID <=EAX: 8000_001C (for extended features, use EAX: 8000_001D) may return certain values. An exemplary set of values is shown below in Table 2, although other values and bit functions are possible and contemplated.

TABLE 2

Profiling Mechanism CPUID values

| Reg | Bits | Mnemonic | Function |
|---|---|---|---|
| EAX | 0 | Enabled | Profiling mechanism is enabled. If this bit is 0, the remainder of the data returned by CPUID should be ignored. |
| EAX | 1 | IRE | Instructions retired event (EventId = 1) is enabled |
| EAX | 2 | BRE | Branch retired event (EventId = 2) is enabled |
| EAX | 3 | DME | DCache miss event (EventId = 3) is enabled |
| EAX | 4:29 | | Reserved for future events |
| EAX | 30 | Extension | Extended CPUID information is available. If 1, information on events with EventId >29 is available by executing CPUID with EAX = 8000_001D. |
| EAX | 31 | Interrupt | Interrupt on threshold overflow is enabled |
| EBX | 7:0 | PCBSize | Size in bytes of the PCB. At least 40 + (PMaxEvents * 8) but implementation may require a larger control block |
| EBX | 15:8 | PEventSize | Size in bytes of an event record in the Profiling Mechanism ring buffer (32 for Profiling Mechanism Version 1). |
| EBX | 23:16 | PMaxEvents | Number of different events that can be monitored simultaneously. |
| EBX | 31:24 | PVersion | Version of Profiling Mechanism implementation (1 for Profiling Mechanism Version 1). |
| ECX | 4:0 | PLatencyMax | Number of bits in cache latency counters (10 to 31) |
| ECX | 5 | PDataAddress | If 1, cache miss event records report the data address of the reference. If 0, data address is not reported. |
| ECX | 8:6 | PLatencyRnd | The amount by which cache latency is rounded. The bottom PLatencyRnd bits of latency information will be zero. The actual number of bits implemented for the counter is PLatencyMax – PLatencyRnd. Must be 0 to 4. |
| ECX | 29:9 | | Reserved |
| ECX | 30 | PCacheLevels | Cache-related events can be filtered by cache level that returned data; the value of CLF in the PCB enables cache level filtering. If 0, CLF is ignored. An implementation must support filtering by either latency or cache level. It may support both. |
| ECX | 31 | PCacheLatency | Cache-related events can be filtered by latency; the value of MinLatency in the PCB is used. If 0, MinLatency is ignored. An implementation must support filtering by either latency or cache level. It may support both. |
| EDX | 0 | Enabled | Profiling Mechanism is available. If this bit is 0, the remainder of the data returned by CPUID should be ignored. |
| EDX | 1 | Interrupt | Interrupt on threshold overflow is available |
| EDX | 2 | IRE | Instructions retired event (EventId = 1) is available |
| EDX | 3 | BRE | Branch retired event (EventId = 2) is available |
| EDX | 4 | DME | DCache miss event (EventId = 3) is available |
| EDX | 5:31 | | Reserved for future events |

In one embodiment, the bits returned in EAX are taken from PMSR0 and reflect the currently enabled features of the profiling mechanism 200. However, these are a subset of the bits returned in EDX, which reflect the full capabilities of the profiling mechanism 200 in the current processor. The OS may enable a subset of the profiling mechanism 200 if it is configured to not support all available features. For example, if the OS is configured not to handle a profiling threshold interrupt, it may disable the feature. User mode software should be configured to interpret the bits in EAX to describe the features it can use. Operating systems should be configured to use the bits from EDX to determine the capabilities of the profiling mechanism 200 and to enable all or some of the available features. It is noted that in other embodiments, the profiling mechanism may report the processor configuration using different instructions or mechanisms and may report additional data and parameters, especially in implementations that are an extension of, or are a subset of the examples given here.

Profiling Enablement and Control

As described above, the PMSRs are model-specific registers which describe and control the profiling mechanism 200 hardware. In one embodiment, the PMSRs are available if EDX bit 0 of CPUID 8000_0001 is set to a logic value of 1.

PMSR0 may be referred to as the profiling mechanism 200 feature enable register. As such, PMSR0 may control how the profiling mechanism 200 can be used on a given processor. Depending on which bits are asserted and to what value, it can prohibit the use of the profiling mechanism 200 or restrict its operation in several ways. The features that may be enabled in PMSR0 are shown below in Table 3. However, it is noted that the PMSR0 features shown in Table 3 are exemplary, and it is contemplated that in other embodiments other functions and bits may be used.

The OS may be configured to load PMSR0 at start-up time (or at the time the profiling mechanism 200 driver is loaded) to indicate its level of support for the profiling mechanism 200. In one implementation, only bits that are set in EDX in response to the CPUID instruction when enumerating the profiling mechanism 200 can be turned on in PMSR0. Attempting to set other bits may cause a #GP fault. User code can examine the contents of PMSR0 by executing CPUID with EAX=8000_001C and then examining the contents of EAX.

TABLE 3

PMSR0 Profiling feature enables

| Bit | Mnemonic | Function | R/W | Reset |
|---|---|---|---|---|
| 0 | Enabled | Enable Profiling Mechanism | R/W | 0 |
| 1 | IRE | Allow Profiling Mechanism to count instructions retired | R/W | 0 |
| 2 | BRE | Allow Profiling Mechanism to count branches retired | R/W | 0 |
| 3 | DME | Allow Profiling Mechanism to count DCache misses | R/W | 0 |
| 4:30 | | Reserved | | 0 |
| 31 | Interrupt | Allow Profiling Mechanism to generate an interrupt when threshold is exceeded | R/W | 0 |

As described above, in conjunction with the description of FIG. 1, PMSR1 provides access to the internal copy of the Profiling Control Block (PCB) pointer. In one embodiment, when in kernel mode, executing a RDMSR instruction to this register performs the operations corresponding to the SLWPCB instruction, and executing a WRMSR instruction to this register performs operations corresponding to the LLWPCB instruction as described further below.

In conjunction with the description of FIG. 1, PMSR2 may provide the value which is stored into the Core Id field of an event record to identify the processor on which the monitored thread is running. This value may be set by the BIOS or the Operating System or it may be initialized by the hardware.

In one embodiment, to enable and disable profiling and to control the events being profiled in user mode, the LLWPCB instruction may be used. Similarly, to query the current state of profiling in user mode, the SLWPCB instruction may be used. These instructions effectively provide user mode access to the PCB pointer in PMSR1. In addition, the LWPINS instruction may allow software insertion of event records into an event ring buffer.

The LLWPCB Instruction

In one embodiment, the LLWPCB instruction (which stands for Load LightWeight Profiling Control Block) may set the state of the profiling mechanism 200 hardware from the Profiling Control Block (PCB) at DS:rAX and enable profiling if specified. It may return the previous value of the PCB address in the rAX register.

In one embodiment, to disable profiling, the LLWPCB instruction may be executed with rAX=0. This operation may only be issued when the machine is in protected mode, but it can be executed at any privilege level. However, if it is executed from a privilege level other than CPL3, the internal PCB pointer is loaded, but the initialization of the remainder of profiling mechanism 200 state may be deferred until the processor enters CPL3. This allows the PCB to be in memory that needs to be paged in immediately, and the page fault will occur from ring 3.

It is noted that in one embodiment, profiling should really only be turned on by the user program. Transitions to CPL3 that implicitly turn on the profiling mechanism 200 should do so using an extended context save/restore mechanism, which restores some of the profiling mechanism 200 volatile state and requires the profiling mechanism 200 to initialize the remainder of its state from the PCB.

If the profiling mechanism 200 is currently active, it flushes its internal state to memory in the old PCB. The profiling mechanism 200 may be configured to then set up new internal state from the new PCB and to write the new PCB.Flags field to indicate the resulting status of the profiling mechanism 200. As described further below, the PCB.Flags field contains bits indicating which events are actually being profiled and whether threshold interrupts are enabled.

The SLWPCB Instruction

In one embodiment, execution of the SLWPCB instruction (which stands for Store LightWeight Profiling Control Block) flushes the current state of the profiling mechanism 200 into the PCB in memory and returns the current address of the PCB in rAX. If the profiling mechanism 200 is not currently active, executing the SLWPCB instruction may set rAX to zero. This operation may only be issued when the machine is in protected mode, but it can be executed at any privilege level.

The LWPINS Instruction

In one embodiment, execution of the LWPINS instruction inserts an event record into the event ring buffer for the currently executing thread and advances the ring buffer pointer in a manner similar to the way hardware inserts a record into the ring buffer. The Event Id of the inserted record may be a predetermined value (e.g., 255) to indicate a user inserted event, and the other fields of the record may be taken from the general registers of the processor at the time the instruction is executed. The LWPINS instruction may clear the processor carry bit (or some other flag bit) to indicate success, or it may set the bit to indicate that the ring buffer is full.

As described further below in conjunction with the description of FIG. 4, the PCB specifies the details of how the profiling mechanism 200 operates. In one embodiment, the PCB includes a number of fields and is stored in an interactive region of memory in which some fields are controlled and modified by the profiling mechanism 200 hardware and others are controlled and modified by the software that processes the profiling mechanism 200 event records. As shown in FIG. 2, monitor logic 18 may be configured to cache a portion of the information from the PCB into internal registers (e.g., control block registers 218) for speed.

Turning to FIG. 4, an exemplary profiling control block 475 is shown. In the illustrated embodiment PCB 475 includes a variable and dynamic number of bytes depending upon, for example, the number of events being monitored. Accordingly, in FIG. 4, the PCB 475 is shown with M+8 bytes. The PCB 475 also includes a number of fields. The fields of PCB 475 are described in greater detail below in conjunction with Table 4. The R/W column in Table 4 indicates how the field is modified while the profiling mechanism 200 is enabled. "Mon Logic" means that monitor logic 18 modifies the field, "Init" means that monitor logic 18 modifies the field while executing the LLWPCB instruction, "SW" means that software may modify it, and "No" means that the field must remain unchanged as long as the PCB is in use. It is noted that in other embodiments, a profiling control block may include other fields having additional or different functionality than the profiling control block shown in FIG. 4 and Table 4, and described herein.

TABLE 4

Profiling Control Block fields

| Field | Description | R/W |
|---|---|---|
| Flags | Flags indicating profiling mechanism state. | Init |
| BufferSize | Total size of the event record buffer (in bytes). Must be a multiple of the event record size (PEventSize). | No |
| Random | Number of bits of randomness to use in counters. Each time a counter is loaded from an interval to start counting down to the next event record, the bottom Random bits are set to a random value. This avoids fixed patterns in events. It is contemplated that a number of mechanisms may be used to get the random values. It is noted that in other embodiments, a second Random field may be included in each event, taking up some of the current Rsvd field. | No |
| BufferBase | Linear address of the event record buffer. Must be aligned on a 32-byte boundary (the low 5 bits of BufferBase are ignored). Software may be configured to align the buffer on a page boundary, but this is not required. | No |
| BufferHeadOffset | Unsigned offset into BufferBase specifying where the monitor logic will store the next event record. When BufferHeadOffset == BufferTailOffset, the buffer is empty. BufferHeadOffset is always < BufferSize and is always a multiple of PEventSize. | Mon. Logic |
| BufferTailOffset | Unsigned offset into BufferBase specifying the oldest event record in the buffer. BufferTailOffset is always < BufferSize and is always a multiple of PEventSize. | SW |
| MissedEvents | 64-bit count of the number of events that were missed. A missed event occurs after monitor logic stores an event record when it increments BufferHeadOffset and discovers that it would be equal to BufferTailOffset. Instead of updating BufferHeadOffset, monitor logic increments the MissedEvents counter. Thus, when the buffer is full, the last event record is overwritten. | Mon. Logic |
| Threshold | If non-zero, threshold for interrupting the user to indicate that the buffer is filling up. When monitor logic advances BufferHeadOffset, it computes the space used as ((BufferHeadOffset − BufferTailOffset) % BufferSize) and compares it to Threshold. If the space used == Threshold and threshold interrupts are enabled, monitor logic causes an interrupt. (Note that no division is needed for the modulus operator; if the difference is < 0, simply add BufferSize to the difference.) The compare for equality ensures that only one interrupt occurs when the threshold is crossed. If zero, no threshold interrupts will be generated. This field is ignored if threshold interrupts are not enabled in PMSR1. | No |
| MinLatency | Minimum latency required to make a cache-related event eligible for profiling counting. Applies to all cache-related events being monitored. The number in MinLatency is multiplied by 16 to get the actual latency in cycles. This scaling provides less resolution but a larger range for filtering. An implementation may have a maximum for the latency value it captures. If MinLatency* 16 exceeds this maximum value, the maximum is used instead. A value of 0 disables filtering by latency.<br>NOTE<br>MinLatency may be ignored if no cache latency event is chosen in one of the EventIdn fields. | No |

TABLE 4-continued

Profiling Control Block fields

| Field | Description | R/W |
|---|---|---|
| | MinLatency is ignored if CPUID indicates that the implementation does not filter by latency. Use the CLF bits to get a similar effect. At least one of these mechanisms must be available. | |
| CLF | Cache Level Filtering. 1 enables filtering cache-related events by the cache level or memory level that returned the data. It enables the next 4 bits, and cache-related events are only eligible for Profiling Mechanism counting if the bit describing the memory level is on. 0 means no cache level filtering, the next 4 bits are ignored, and any cache or memory level is eligible.<br>NOTE<br>CLF may be ignored if no cache latency event is chosen in one of the EventIdn fields.<br>CLF is ignored if CPUID indicates that the implementation does not filter by cache level. Use the MinLatency field to get a similar effect. At least one of these mechanisms must be available. | No |
| NBC | Set to 1 to record cache-related events that are satisfied from data held in a cache that resides on the Northbridge. Ignored if CLF is 0. | No |
| RDC | Set to 1 to record cache-related events that are satisfied from data held in a remote data cache. Ignored if CLF is 0 | No |
| RAM | Set to 1 to record cache-related events that are satisfied from DRAM. Ignored if CLF is 0 | No |
| OTH | Set to 1 to record cache-related events that are satisfied from other sources, such as MMIO, Config space, PCI space, or APIC. Ignored if CLF is 0 | No |
| NDB | No direct branches. 1 means direct branches will not be counted. This only applies to unconditional RIP-relative branches. Conditional branches, indirect jumps through a register or memory, calls, and returns are counted normally. This value is ignored if the Branches Retired event is not chosen in one of the EventIdn fields.<br>It is noted that in embodiments that define a separate event for non-direct branches this field may be omitted. | No |
| EventInterval0 | Number of events of type EventId0 to count before storing an event record. | No |
| EventId0 | EventId of the event to count in this counter. 0 means disable this counter. It is invalid to specify the same EventId in two or more counters and may cause unpredictable results. | No |
| EventCounter0 | Starting or current value of counter | Mon. Logic |
| Event1 . . . | (Repeat counter configuration PMaxEvents times . . .) | |

In the embodiment shown in FIG. 4, the flags field includes five flags that are in bit locations 0-3 and 31. The flags are EN, IRE, BRE, DME, and INT, respectively. The En flag indicates whether profiling is enabled or not. The IRE flag indicates whether the Instructions retired events are enabled, the BRE flag indicates whether the Branches retired events are enabled, the DME flag indicates whether the DCache Misses events are enabled, and the INT flag indicates whether threshold interrupts are enabled. Other embodiments that may monitor additional events and may contain additional flag bits.

Most of the fields in the PCB may be constant for the duration of a profiling session (the time between enabling the profiling mechanism 200 and disabling it). This means that they are loaded into the profiling mechanism 200 hardware when it is enabled, and may be periodically reloaded from the same location as needed. The contents of the constant fields must not be changed during a profiling run or results will be unpredictable. In addition, changing the PCB memory to read-only or unmapped may cause an exception the next time the monitor logic 18 attempts to access it.

A few fields may be modified by the monitor logic 18 to communicate progress to the software that is emptying the event record buffer. Software may read them but should never modify them while the profiling mechanism 200 is enabled. Other fields may enable software to indicate that progress has been made in emptying the ring buffer. Software may write these fields and the monitor logic 18 may read them as needed. For efficiency, as mentioned above, some of the PCB fields may be shadowed in control block registers 218 when profiling is active. Monitor logic 18 may refresh these fields from (or flush them to) memory as needed to allow software to make progress as described further below.

As described above, several of the PCB fields may be written asynchronously by the monitor logic 18 and by the user software. Several techniques may be used to reduce the associated memory traffic. For example, the monitor logic 18 may keep internal copies of the buffer head and tail pointers. It need not flush the head pointer to the PCB every time it stores an event record. Instead, the flush may be deferred until a threshold or buffer full event happens, or until context needs to be saved for a context switch. Accordingly, exceeding the buffer threshold should force the head pointer to memory so that a process or thread polling the ring buffer will be able to see forward progress.

The monitor logic 18 need not read the software-maintained tail pointer unless it detects a threshold or buffer full condition. At that point, the monitor logic 18 may be configured to reread the tail pointer to see if software has emptied some records from the buffer. If so, it recomputes the threshold condition and acts accordingly. This implies that software polling the buffer should begin processing event records when it detects a threshold event itself. To avoid a race condition with software, the monitor logic 18 should reread the tail pointer every time it stores an event record while the threshold condition appears to be true. Alternatively, monitor logic 18 may reread the tail pointer every nth time for some small n.

In various embodiments, multiple events are possible when an instruction retires. For example, an indirect jump through a pointer in memory can trigger the instructions retired, branches retired, and DCache miss events simultaneously. The profiling mechanism may be configured to count all events that apply to the instruction, but only report one event per instruction. The other events will not cause an event record to be stored. The choice of which event to report is implementation dependent, and may vary from run to run on the same processor. Doing so may ensure that an instruction that regularly causes multiple events can be reported in all of its categories since the events' counters may expire at varying intervals. It is noted that in other embodiments, a priority scheme may be used to prioritize the events when multiple events occur.

It is noted that the OS must ensure that information does not leak from one process to another or from the kernel to a user process. Hence, if it supports the profiling mechanism 200 at all, the OS must ensure that the state of the monitor logic 18 is set appropriately when a context switch occurs. In a system with hardware context switch support, this should happen automatically. Otherwise, the PCB pointer for each process must be saved and restored as part of the process context.

Various implementations of the profiling mechanism 200 have internal state to hold the current values of the counters for the various events (up to the maximum number of simultaneous events supported), a copy of the pointer into the event buffer, and a copy of the tail pointer for quick detection of threshold and overflow states. In some embodiments, there are times when the system must preserve the volatile profiling state. When the OS context switches from one user thread to another, the old user state must be saved with the thread's context and the new state must be loaded. When a hypervisor decides to switch from one guest OS to another, the same must be done for the guest systems' states. Finally, state must be stored and reloaded when the system enters and exits SMM, since the SMM code may decide to shut off power to the core. The amount of state to be preserved is quite small. In the exemplary embodiment, the PCB address is eight bytes, the BufferHeadOffset value is four bytes, the 26-bit counter values are four bytes each, and a flag indicating that the MissedEvents counter must be incremented (1 bit). All of the remaining profiling state may be reconstructed from the PCB itself.

The SMM save area may include the volatile profiling state. SMM entry and exit may save and restore profiling state as necessary. State must be saved when the processor is going to change power state, but since profiling is executed in CPL3 only, its state should not need to be saved and restored otherwise.

As described above, the PCB may not be in memory at all times. Therefore, the monitor logic 18 must not attempt to access it while still in the OS kernel/VMM/SMM, since that access might fault. The profiling state restore must only be done once the processor is in CPL3 and can take a page fault exception without crashing.

It is noted that although the embodiments described above include a node having multiple processor cores, it is contemplated that the functionality associated with cache system 200 and 400 may be used in any type of processor, including single core processors. In such embodiments, the monitor logic 18 may reside within the individual core. It is also noted that although the various embodiments describe particular entities as hardware or software entities, it is contemplated that any entity described above may be implemented in hardware, software, or a combination as desired.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor including one or more processor cores, the processor comprising:
    execution logic configured to execute instructions including one or more processes each having one or more execution threads; and
    a profiling mechanism comprising:
        monitor logic configured to monitor selected ones of the one or more processes, record performance data associated with the selected ones of the one or more processes, and store the performance data within a storage buffer without interrupting a flow of control of the selected ones of the one or more processes being monitored;
        wherein the monitor logic includes a plurality of model specific registers, wherein a first model specific register includes a plurality of bits, each configured to enable and disable a respective monitoring function;
        a monitor process configured to transfer the performance data from the storage buffer to another storage.

2. The processor as recited in claim 1, wherein the monitor process comprises program instructions executable by the one more processor cores while operating in user mode.

3. The processor as recited in claim 1, wherein portions of the monitor logic are accessible while the one or more processor cores are operating in user mode.

4. The processor as recited in claim 1, wherein the first model specific register is accessible via user mode instructions.

5. A processor including one or more processor cores, the processor comprising:
    execution logic configured to execute instructions including one or more processes each having one or more execution threads; and
    a profiling mechanism comprising:
        monitor logic configured to monitor selected ones of the one or more processes, record performance data associated with the selected ones of the one or more processes, and store the performance data within a storage buffer without interrupting a flow of control of the selected ones of the one or more processes being monitored;
        wherein the monitor logic includes a plurality of model specific registers that are accessible while the one or more processor cores are operating in a kernel mode by performing read and write operations to the plurality of model specific registers;

a monitor process configured to transfer the performance data from the storage buffer to another storage.

6. A processor including one or more processor cores, the processor comprising:
execution logic configured to execute instructions including one or more processes each having one or more execution threads; and
a profiling mechanism comprising:
monitor logic configured to monitor selected ones of the one or more processes, record performance data associated with the selected ones of the one or more processes, and store the performance data within a storage buffer without interrupting a flow of control of the selected ones of the one or more processes being monitored;
wherein the monitor logic is further configured to create the storage buffer as a storage buffer area within a respective address space of each of the one or more processes being monitored;
a monitor process configured to transfer the performance data from the storage buffer to another storage.

7. The processor as recited in claim 6, wherein the performance data includes occurrences of predetermined events and to write corresponding event records to the storage buffer area.

8. The processor as recited in claim 7, wherein the monitor process is configured to execute polling instructions to determine if each storage buffer area of each respective address space of each of the one or more processes being monitored is filled to a predetermined threshold.

9. The processor as recited in claim 8, wherein in response to determining that a given storage buffer area is filled to a predetermined threshold, the monitor logic is configured to notify the monitor process.

10. The processor as recited in claim 9, wherein the monitor logic is further configured to generate an interrupt to an operating system executing on one of the processor cores, wherein in response to the interrupt the operating system is configured to notify a user process that includes monitor process instructions, wherein the user process is configured to examine the event records and to perform one or more predetermined actions corresponding to the event records.

11. The processor as recited in claim 9, wherein the monitor logic is further configured to generate an interrupt to an operating system executing on one of the processor cores, wherein in response to the interrupt the operating system is configured to notify a user process that includes monitor process instructions, wherein the user process is configured to examine the event records and to transfer the event records from a given storage buffer to a non-volatile storage.

12. The processor as recited in claim 8, wherein in response to determining that a given storage buffer area is filled to a predetermined threshold, the monitor logic is configured to generate an interrupt to an operating system executing on one of the processor cores, wherein in response to the interrupt the operating system notifies a user process that includes monitor process instructions, wherein the user process is configured to examine the event records and to transfer the event records from a given storage buffer to a non-volatile storage.

13. A processor including one or more processor cores, the processor comprising:
execution logic configured to execute instructions including one or more processes each having one or more execution threads; and
a profiling mechanism comprising:
monitor logic configured to monitor selected ones of the one or more processes, record performance data associated with the selected ones of the one or more processes, and store the performance data within a storage buffer without interrupting a flow of control of the selected ones of the one or more processes being monitored;
a monitor process configured to transfer the performance data from the storage buffer to another storage;
wherein the monitor process comprises a single monitor thread configured to monitor any other thread, wherein the single monitor thread maintains event records for each of the monitored threads.

14. A processor including one or more processor cores, the processor comprising:
execution logic configured to execute instructions including one or more processes each having one or more execution threads; and
a profiling mechanism comprising:
monitor logic configured to monitor selected ones of the one or more processes, record performance data associated with the selected ones of the one or more processes, and store the performance data within a storage buffer without interrupting a flow of control of the selected ones of the one or more processes being monitored;
a monitor process configured to transfer the performance data from the storage buffer to another storage;
wherein the monitor process is configured to create and store within a system memory, a profiling control block comprising a plurality of fields that control the operation of the monitor logic and the gathering of the performance data.

* * * * *